(12) United States Patent
Matsubara (10) Patent No.: US 10,974,551 B2
(45) Date of Patent: Apr. 13, 2021

(54) PNEUMATIC TIRE

(71) Applicant: TOYO TIRE & RUBBER CO., LTD., Itami (JP)

(72) Inventor: Keisuke Matsubara, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 224 days.

(21) Appl. No.: 16/050,128

(22) Filed: Jul. 31, 2018

(65) Prior Publication Data

US 2019/0054776 A1 Feb. 21, 2019

(30) Foreign Application Priority Data

Aug. 17, 2017 (JP) .............................. JP2017-157530

(51) Int. Cl.
*B60C 13/02* (2006.01)
*B60C 11/01* (2006.01)

(52) U.S. Cl.
CPC .............. *B60C 13/02* (2013.01); *B60C 11/01* (2013.01)

(58) Field of Classification Search
CPC .... B60C 13/02; B60C 11/01; B60C 2011/013
See application file for complete search history.

(56) References Cited

U.S. PATENT DOCUMENTS

| | | | |
|---|---|---|---|
| 2002/0074071 A1 | 6/2002 | Oyama | |
| 2008/0210355 A1* | 9/2008 | Harvey | ............... B60C 11/0304 152/209.8 |
| 2012/0073719 A1* | 3/2012 | Kurosawa | ............. B60C 13/002 152/523 |
| 2012/0216930 A1 | 8/2012 | Matsuda | |
| 2016/0129733 A1* | 5/2016 | Fujioka | ................... B60C 11/01 152/209.18 |
| 2017/0210182 A1* | 7/2017 | Mori | ..................... B60C 13/002 |
| 2018/0029424 A1* | 2/2018 | Satake | .................... B60C 13/02 |
| 2018/0290497 A1* | 10/2018 | Franklin | ............. B60C 11/0304 |
| 2019/0016179 A1 | 1/2019 | Yamakawa | |

FOREIGN PATENT DOCUMENTS

| | | |
|---|---|---|
| CN | 102416830 A | 4/2012 |
| CN | 102649390 A | 8/2012 |
| JP | 2002-127717 A | 5/2002 |
| JP | 2003-112505 A | 4/2003 |
| JP | 2015-168301 A | 9/2015 |
| JP | 2016-088338 A | 5/2016 |
| JP | 2017-124733 A | 7/2017 |

OTHER PUBLICATIONS

Office Action dated Mar. 5, 2020, issued in counterpart CN Application No. 201810840276.9, with English translation (15 pages).
Office Action dated Sep. 15, 2020, issued in counterpart CN Application No. 201810840276.9, with English translation (11 pages).

* cited by examiner

*Primary Examiner* — Jacob T Minskey
*Assistant Examiner* — Virak Nguon
(74) *Attorney, Agent, or Firm* — Westerman, Hattori, Daniels & Adrian, LLP (57) ABSTRACT

A pneumatic tire includes a sidewall region extending in a tire radial direction, the sidewall region comprises a protruding region that protrudes in a tire width direction, and a recess that is recessed in the tire width direction, the protruding region extends in the tire radial direction, and the recess is contiguous with the protruding region.

19 Claims, 5 Drawing Sheets

PNEUMATIC TIRE

CROSS REFERENCE TO RELATED APPLICATIONS

This application claims the benefit of priority of Japanese application no. 2017-157530, filed on Aug. 17, 2017, which is incorporated herein by reference.

BACKGROUND OF THE INVENTION

Field of the Invention

The present invention relates to a pneumatic tire having a sidewall region that is provided with a protruding region which protrudes therefrom in the tire width direction.

Description of the Related Art

Conventionally known as a pneumatic tire is a pneumatic tire having a sidewall region that is provided with a plurality of protruding regions which protrude therefrom in the tire width direction (e.g., Japanese Patent Application Publication Kokai No. 2015-168301). In accordance with such constitution, under bad road conditions such as when the terrain is sandy, rocky, and/or muddy, because traction (nonslipping grabbing force) is produced due to the plurality of protruding regions, it is possible to improve driveability under bad road conditions.

At the pneumatic tire associated with Japanese Patent Application Publication Kokai No. 2015-166301, sidewall regions are provided with recesses arranged so as to be separated by some distance from the protruding regions. This results in improved uniformity with regard to weight balance. However, with such a constitution, it is sometimes the case that mud (including clumps of sand produced when mud dries and so forth) that has entered a recess is not expelled to the exterior of the recess.

SUMMARY OF THE INVENTION

The problem is therefore to provide a pneumatic tire permitting improvement in uniformity with regard to weight balance while also permitting improvement in the mud shedding capability of the recess.

There is provided a pneumatic tire, which includes:
a sidewall region extending in a tire radial direction;
wherein the sidewall region comprises a protruding region that protrudes in a tire width direction, and a recess that is recessed in the tire width direction;
wherein the protruding region extends in the tire radial direction; and
wherein the recess is contiguous with the protruding region.

Further, the pneumatic tire may have a configuration in which:
wherein the recess is made up of an outer half-recess contiguous with an outer region in the tire radial direction of the protruding region, and an inner half-recess contiguous with an inner region in the tire radial direction of the protruding region; and
recess volume of the outer half-recess is greater than recess volume of the inner half-recess.

Further, the pneumatic tire may have a configuration in which:
wherein depth of the outer half-recess is greater than depth of the inner half-recess.

Further, the pneumatic tire may have a configuration in which:
wherein the recess comprises a radially outer recessed region that is contiguous with an exterior face in the tire radial direction of the protruding region, and a radially inner recessed region that is contiguous with an interior face in the tire radial direction of the protruding region; and
wherein depth of the radially outer recessed region is greater than depth of the radially inner recessed region.

Further, the pneumatic tire may have a configuration in which:
wherein the recess comprises a circumferentially recessed region that is contiguous with the protruding region in a tire circumferential direction;
wherein the circumferentially recessed region comprises an outer circumferentially recessed region that is contiguous with the outer region in the tire radial direction of the protruding region, and an inner circumferentially recessed region that is contiguous with the inner region in the tire radial direction of the protruding region; and
wherein depth of the outer circumferentially recessed region is greater than depth of the inner circumferentially recessed region.

Further, the pneumatic tire may have a configuration in which:
wherein the recess comprises a radially outer recessed region that is contiguous with an exterior face in the tire radial direction of the protruding region, a radially inner recessed region that is contiguous with an interior face in the tire radial direction of the protruding region, and a circumferentially recessed region that is contiguous with the protruding region in a tire circumferential direction;
wherein the circumferentially recessed region comprises an outer circumferentially recessed region that is contiguous with the outer region in the tire radial direction of the protruding region, and an inner circumferentially recessed region that is contiguous with the inner region in the tire radial direction of the protruding region;
wherein depth of the radially outer recessed region is greater than depth of the outer circumferentially recessed region;
wherein depth of the outer circumferentially recessed region is greater than depth of the inner circumferentially recessed region; and
wherein depth of the inner circumferentially recessed region is greater than depth of the radially inner recessed region.

Further, the pneumatic tire may have a configuration in which:
wherein width of the outer half-recess is greater than width of the inner half-recess.

Further, the pneumatic tire may have a configuration in which:
wherein length of a first boundary between the outer half-recess and the outer region in the tire radial direction of the protruding region with which the outer half-recess is contiguous is greater than length of a secondary boundary between the inner half-recess and the inner region in the tire radial direction of the protruding region with which the inner half-recess is contiguous.

Further, the pneumatic tire may have a configuration in which:
wherein the protruding region is one among a plurality of protruding regions arrayed in a tire circumferential direction in such fashion that there is a gap between an adjacent pair of the protruding regions;

wherein a dimension in the tire circumferential direction of at least one of the pair of protruding regions is greater than a dimension in the tire circumferential direction of the gap between the pair of protruding regions; and wherein a dimension in the tire radial direction of at least one of the pair of protruding regions is greater than the dimension in the tire circumferential direction of the at least one of the pair of protruding regions.

Further, the pneumatic tire may have further:

a tread region having a plurality of grooves extending to an exterior edge of the tread region in the tire width direction, and a plurality of blocks partitioned by the plurality of grooves so as to be arrayed in the tire circumferential direction;

wherein the protruding portion is one among a plurality of protruding regions arrayed in the tire circumferential direction in such fashion that there are gaps therebetween;

wherein, as viewed from an exterior location in the tire width direction, the protruding regions are aligned with the blocks in the tire radial direction; and wherein, as viewed from an exterior location in the tire width direction, the gaps are aligned with the grooves in the tire radial direction.

As described above, excellent benefits are provided in that a pneumatic tire is made capable of improvement in uniformity with regard to weight balance while also being made capable of improvement in the mud shedding capability of the recess.

DETAILED DESCRIPTION OF THE INVENTION

Below, an embodiment of a pneumatic tire is described with reference to FIG. 1 through FIG. 4. At the respective drawings (and the same is true for FIG. 5 and FIG. 6), note that dimensional ratios at the drawings and actual dimensional ratios are not necessarily consistent, and note further that dimensional ratios are not necessarily consistent from drawing to drawing.

Figure 1:
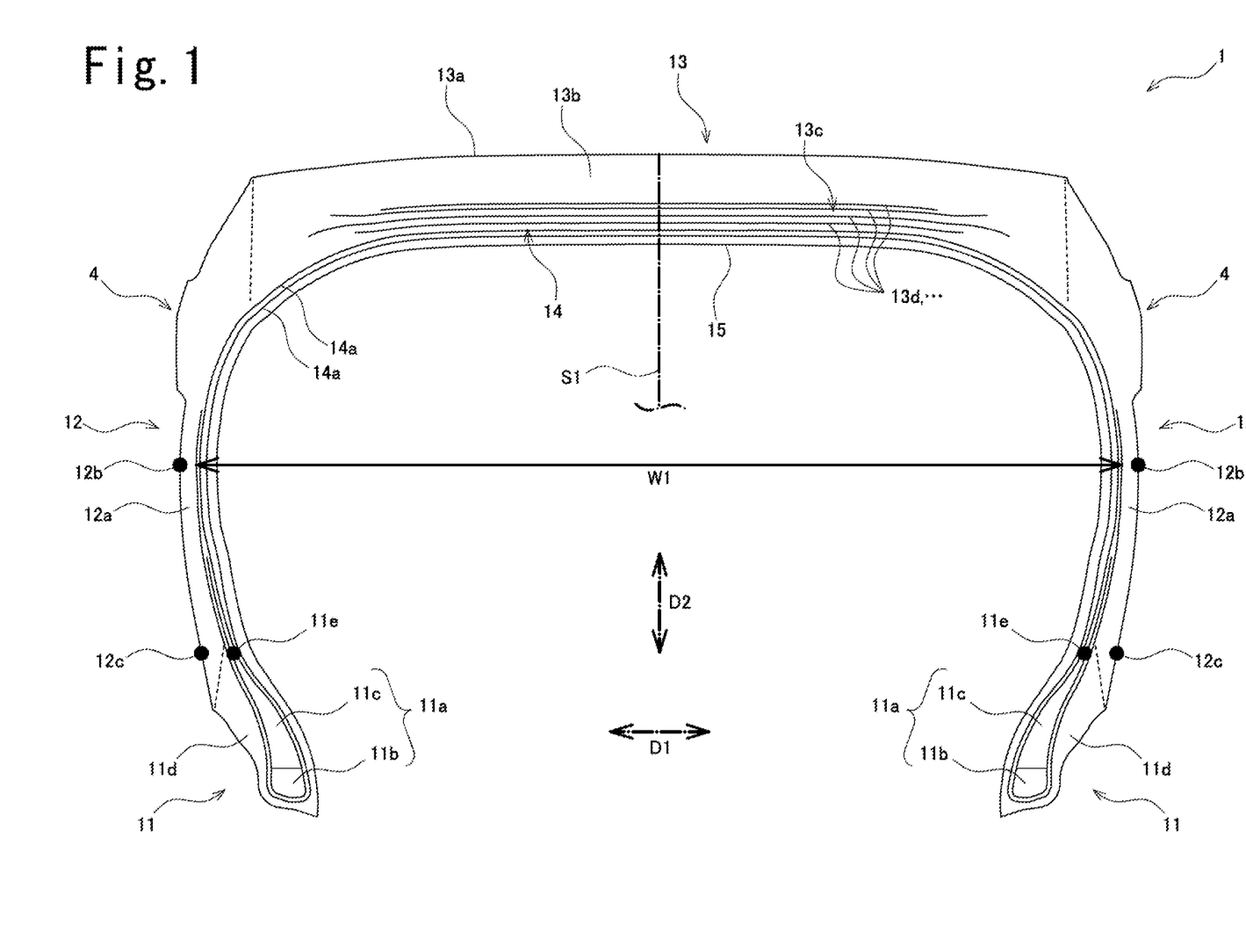
FIG. 1 is a sectional view of the principal components in a tire meridional plane of a pneumatic tire associated with an embodiment.

As shown in FIG. 1, pneumatic tire (hereinafter sometimes referred to as simply "tire") 1 associated with the present embodiment is provided with a pair of bead regions 11 having beads 11a. In addition, tire 1 is provided with sidewall regions 12 that extend toward the exterior in the tire radial direction D2 from respective bead regions 11; and tread region 13 having, at the exterior in the tire radial direction D2, tread surface 13a which comes in contact with the ground and which is coupled to the respective exterior edges in the tire radial direction D2 of the pair of sidewall regions 12. Note that tire 1 may be mounted on a rim (not shown).

Furthermore, tire 1 is provided with carcass layer 14 suspended between pair of beads 11a, 11a; and inner-liner 15 that is arranged toward the interior from carcass layer 14 and that faces the interior space of tire 1 which is or will be filled with air. Carcass layer 14 and inner-liner 15 are arranged in parallel fashion with respect to the inner circumferential surface of the tire over a portion thereof that encompasses bead regions 11, sidewall regions 12, and tread region 13.

At FIG. 1 (and the same is true for the drawings below), first direction D1 is the tire width direction D1 which is parallel to the rotational axis of the tire, second direction D2 is the tire radial direction D2 which is the direction of the diameter of tire 1, and third direction D3 (see FIG. 2) is the tire circumferential direction D3 which is the direction that is circumferential about the rotational axis of the tire. Furthermore, tire equatorial plane S1 is a plane that is located centrally in the tire width direction D1 and that is perpendicular to the rotational axis of the tire; tire meridional planes are planes that are perpendicular to tire equatorial plane S1 and that contain the rotational axis of the tire.

Bead 11a is provided with bead core 11b which is formed so as to be annular in shape, and bead filler 11c which is arranged toward the exterior in the tire radial direction D2 from bead core 11b. For example, bead core 11b might be formed by laminating rubber-covered bead wire(s) (e.g., metal wire(s)), and bead filler 11c might be formed from hard rubber that has been made to taper as one proceeds toward the exterior in the tire radial direction D2.

Bead region 11 is provided with rim strip rubber 11d which is arranged toward the exterior in the tire width direction D1 from carcass layer 14 and which is intended to constitute the outer surface that will come in contact with the rim. Sidewall region 12 is provided with sidewall rubber 12a which is arranged toward the exterior in the tire width direction D1 from carcass layer 14 and which is intended to constitute the outer surface.

Tread region 13 is provided with tread rubber 13b at which the outer surface constitutes tread surface 13a, and belt region 13c which is arranged between tread rubber 13b and carcass layer 14. Belt region 13c is provided with a plurality (four at FIG. 1) belt plies 13d. For example, belt plies 13d might be provided with a plurality of belt cords (e.g., organic fiber and/or metal) which are arrayed in parallel fashion, and topping rubber with which the belt cords are covered.

Carcass layer 14 is made up of at least one (two at FIG. 1) carcass ply 14a. Carcass ply 14a folds back upon itself and wraps about bead 11a so as to envelop bead 11a. Furthermore, carcass ply 14a is provided with a plurality of ply cords (e.g., organic fiber and/or metal) which are arrayed in direction(s) more or less perpendicular to the fire circumferential direction D3, and topping rubber with which the ply cords are covered.

Inner-liner 15 has superior functionality in terms of its ability to impede passage of gas therethrough so as to permit air pressure to be maintained. At sidewall region 12, note that inner-liner 15 is in intimate contact with the inside circumferential surface of carcass layer 14, there being no other member that intervenes between inner-liner 15 and carcass layer 14.

For example, distance between the inner circumferential surface of the tire (inner circumferential surface of inner-liner 15) and the carcass ply 14a which is arranged nearest to the inner circumferential surface might be 90% to 180% at sidewall region 12 of what it is at tread region 13. More specifically, this distance might be 120% to 160% at sidewall region 12 of what it is at tread region 13.

Sidewall regions 12 are such that provided at the outer surface thereof are locations 12b which are at the same locations in the tire radial direction D2 as the locations at which tire width is a maximum (more specifically, the locations at which distance W1 between respective exterior points in the tire width direction D1 of carcass layer 14 is a maximum). Below, these locations 12b are referred to as tire maximum width locations 12b.

Furthermore, sidewall regions 12 are such that provided at the outer surface thereof are locations 12c which are at the same locations in the tire radial direction D2 as exterior edges 11e of bead filler 11c in the tire radial direction D2. Below, these locations 12c are referred to as bead filler exterior edge locations 12c.

Figure 2:
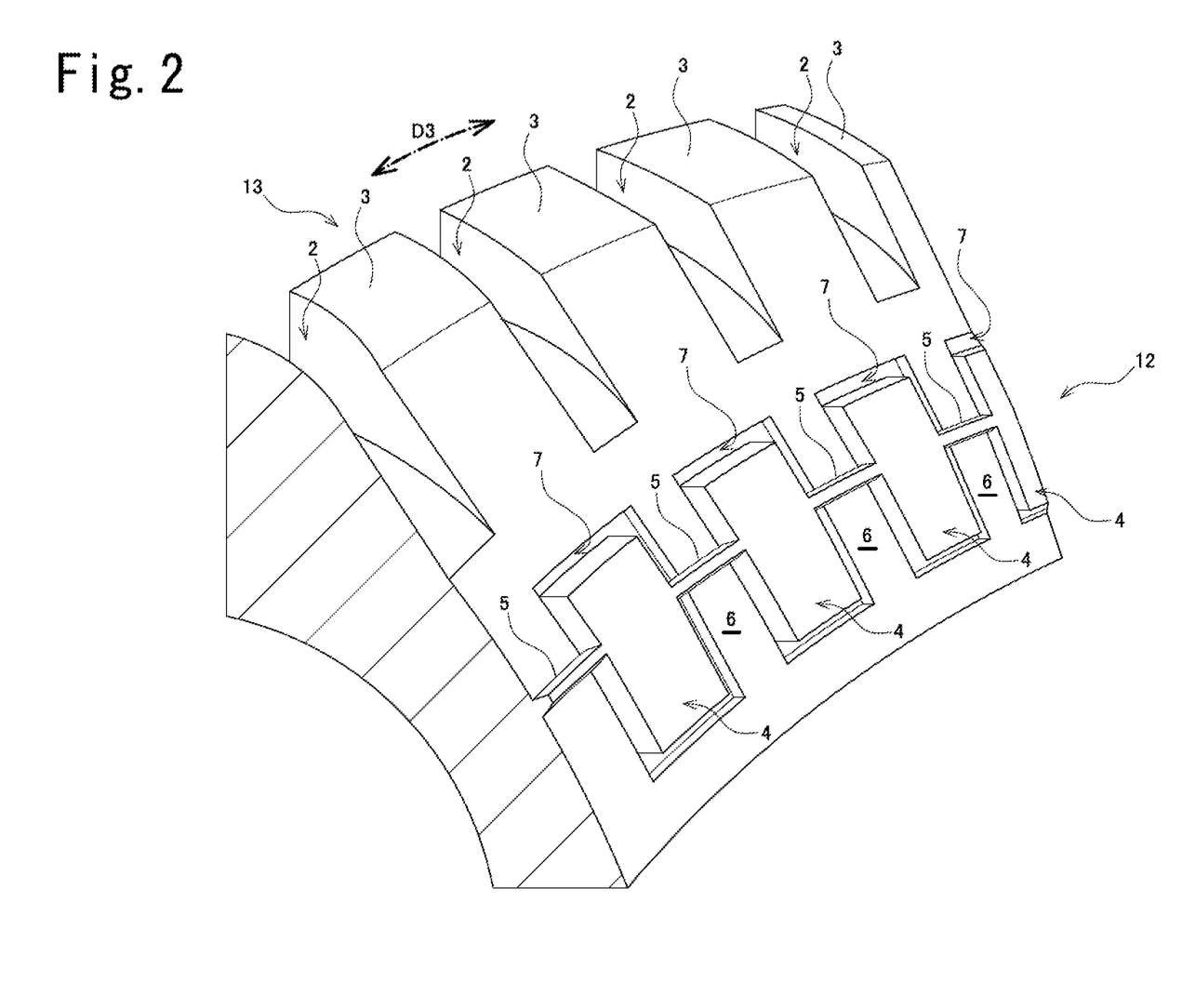
FIG. 2 is a perspective view of the principal components of a pneumatic tire associated with same embodiment.
Figure 3:
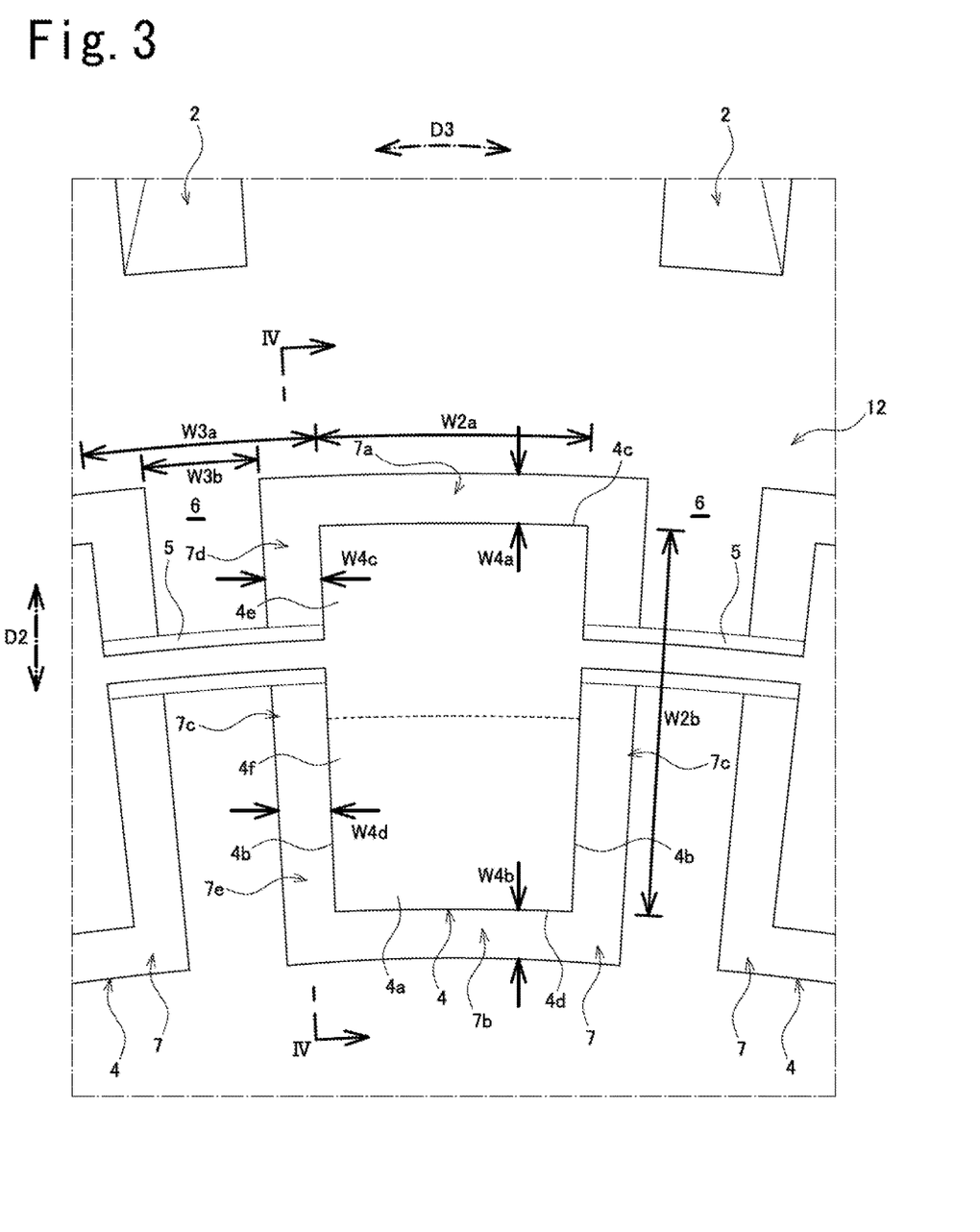
FIG. 3 is a side view (drawing as viewed in the tire width direction) of the principal components of a pneumatic tire associated with same embodiment.

As shown in FIG. 2 and FIG. 3, tread region 13 is provided with a plurality of grooves 2 extending to the exterior edge in the tire width direction D1, and a plurality of blocks 3 partitioned by the plurality of grooves 2 so as to be arrayed in the tire circumferential direction D3. Sidewall region 12 is provided with a plurality of protruding regions 4 which protrude in the tire width direction D1, and a plurality of annular projections 5 which extend in the tire circumferential direction D3. Note that tire 1 may also be constituted such that it is not provided with annular projections 5.

Protruding regions 4 are such that a plurality thereof are arrayed, with gaps 6 therebetween, in the tire circumferential direction D3, and annular projections 5 are arranged in the gaps 6 between protruding regions 4, 4 so as to interconnect protruding regions 4, 4. Note that, as viewed from an exterior location in the tire width direction D1, protruding regions 4 are arranged so as to be aligned with blocks 3 in the tire radial direction D2, and gaps 6 are arranged so as to be aligned with grooves 2 in the tire radial direction D2.

Furthermore, protruding regions 4 and annular projections 5 are arranged at least at the exterior in the tire radial direction D2 of sidewall regions 12. In accordance with the present embodiment, protruding regions 4 and annular projections 5 are arranged toward the exterior in the tire radial direction D2 from bead filler exterior edge locations 12c (see FIG. 1) of sidewall regions 12. More specifically, protruding regions 4 are arranged toward the exterior in the tire radial direction D2 from tire maximum width locations 12b (see FIG. 1) of sidewall regions 12.

As a result, under muddy and/or sandy conditions, when the weight of the vehicle causes tire 1 to sink such that it is buried under mud and/or sand, protruding regions 4 and annular projections 5 are able to come in contact with the ground; and under rocky conditions, protruding regions 4 and annular projections 5 are able to come in contact with irregular surfaces of rocks. That is, protruding regions 4 and annular projections 5 come in contact with the ground under bad road conditions such as when the terrain is muddy, sandy, and/or rocky. Note that protruding regions 4 and annular projections 5 do not come in contact with the ground during normal travel on a flat road.

Thus, existence of irregular shapes formed by protruding regions 4 and annular projections 5 permits formation of surface and edge components. In addition, at locations where contact with the ground takes place at mud, sand, or rock, formation of irregular shapes permits increase in the area over which contact with the ground occurs at mud, sand, or rock; furthermore, surfaces and edges resulting from such irregular shapes facilitate contact with the ground at mud, sand, or rock at a variety of locations. In this way, formation of irregular shapes at locations where contact with the ground takes place at mud, sand, or rock improves traction capability.

Figure 4:
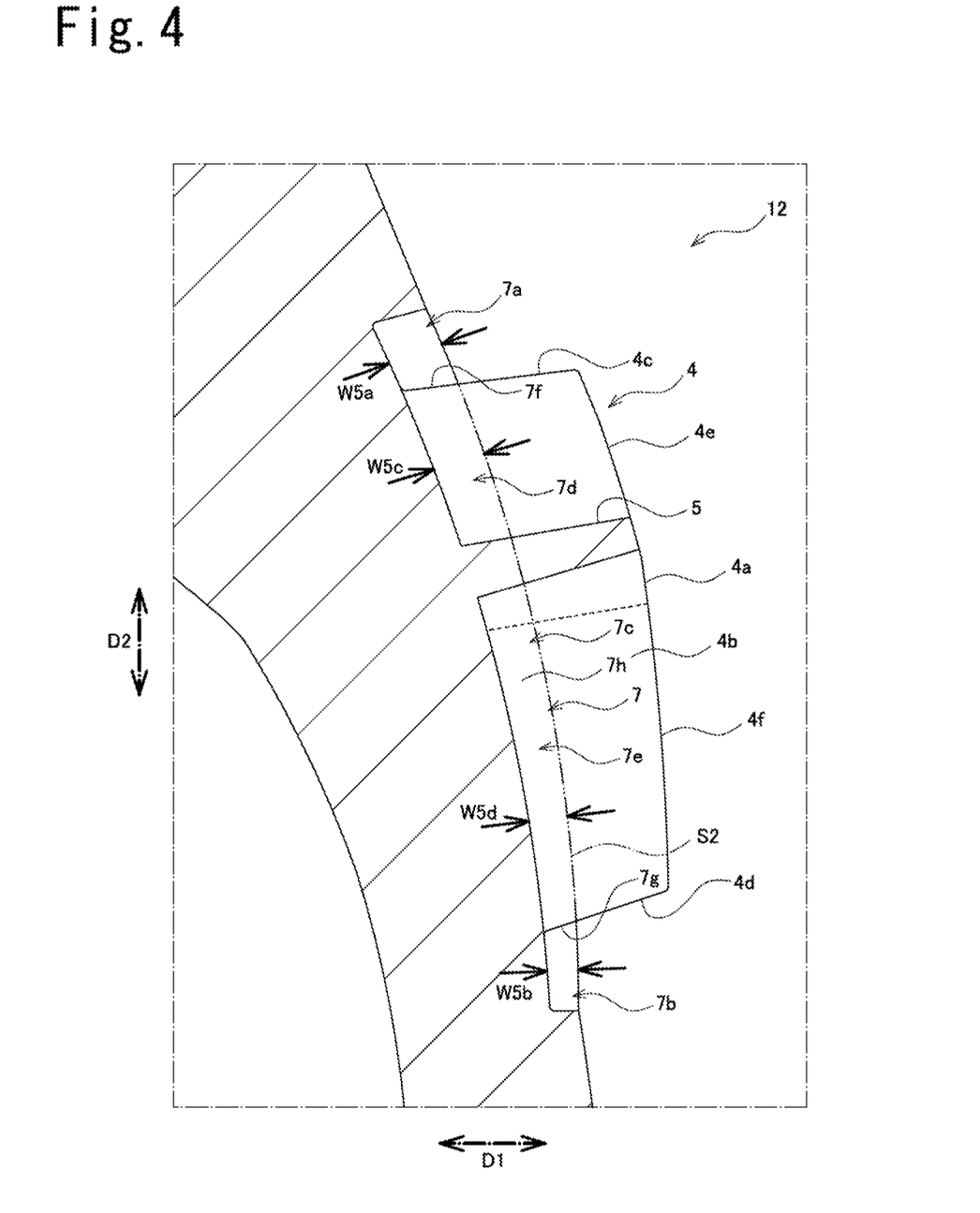
FIG. 4 is a sectional view of section IV-IV in FIG. 3.

As shown in FIG. 3 and FIG. 4, sidewall region 12 is provided with recesses 7 that are recessed in the tire width direction D1. In addition, protruding region 4 extends in the tire radial direction D2, recess 7 being contiguous with protruding region 4 such that no gap exists between recess 7 and protruding region 4. Note that a portion of recess 7 (specifically, the portion thereof which is arranged between protruding regions 4, 4 in the tire circumferential direction D3) is arranged in gap 6 between protruding regions 4, 4.

Protruding regions 4 and annular projections 5 respectively protrude outwardly in the tire width direction D1 from the profile surface (reference surface) S2. Moreover, the amount by which protruding region 4 protrudes from profile surface S2 might, for example, be not less than 2.5 mm, it being preferred that this be not less than 8 mm. Furthermore, the amount by which protruding region 4 protrudes from profile surface S2 might be the same as the amount by which annular projection 5 protrudes from profile surface S2, or might be greater than the amount by which this protrudes therefrom.

Recesses 7 are respectively recessed toward the interior in the tire width direction D1 from profile surface S2. Moreover, widths W4a through W4d at recess 7 might, for example, be 1 mm to 10 mm, it being preferred that these be 2 mm to 8 mm; and depths W5a through W5d at recess 7 might, for example, be 1 mm to 8 mm, it being preferred that these be 2 mm to 4 mm.

Dimension W2a in the tire circumferential direction D3 of protruding region 4 is greater than dimension W3b, which corresponds to the flat portion (the portion at which recess 7 is not present) of gap 6 in the tire circumferential direction D3 between protruding regions 4, 4. In the present embodiment, dimension W2a in the tire circumferential direction D3 of protruding region 4 is greater than dimension W3a of gap 6 in the tire circumferential direction D3 between protruding regions 4, 4. Furthermore, dimension W2b in the tire radial direction D2 of protruding region 4 is greater than dimension W2a in the tire circumferential direction D3 of protruding region 4.

Protruding region 4 is provided with apex 4a which is formed so as to be planar; pair of circumferentially lateral faces 4b, 4b which are arranged at the sides in the tire circumferential direction D3; radially outer face 4c which is arranged toward the exterior in the tire radial direction D2; and radially inner face 4d which is arranged toward the interior in the tire radial direction D2. Furthermore, protruding region 4 is provided with outer region 4e which is arranged toward the exterior in the tire radial direction D2; and inner region 4f which is arranged toward the interior in the tire radial direction D2.

Note that outer region 4e and inner region 4f are regions which are respectively formed by bisecting protruding region 4 in the tire radial direction D2. At FIG. 3 and FIG. 4 (and the same is true for FIG. 5 and FIG. 6), the boundary between outer region 4e and inner region 4f is shown in broken line. Furthermore, as protruding region 4 is bisected in the tire radial direction D2 to form outer region 4e and inner region 4f, recess 7 may be considered to comprise an outer half-recess and an inner half-recess, the outer half-recess being contiguous with the outer region 4e, and the inner half-recess being contiguous with inner region 4f.

Recess 7 is arranged in contiguous fashion with respect to the entire periphery of protruding region 4. More specifically, recess 7 is provided with radially outer recessed region 7a which is contiguous with the exterior in the tire radial direction D2 of protruding region 4; radially inner recessed region 7b which is contiguous with the interior in the tire radial direction D2 of protruding region 4; and circumferentially recessed regions 7c, 7c which are contiguous with protruding region 4 in the tire circumferential direction D3. Note that the portion of circumferentially recessed region 7c which is contiguous with outer region 4e of protruding region 4 is referred to as outer circumferentially recessed region 7d, and the portion of circumferentially recessed region 7c which is contiguous with inner region 4f of protruding region 4 is referred to as inner circumferentially recessed region 7e.

Radially outer recessed region 7a is contiguous with radially outer face 4c of protruding region 4, and face 7f of radially outer recessed region 7a is continuous with radially outer face 4c. in addition, radially inner recessed region 7b is contiguous with radially inner face 4d of protruding region 4, and face 7g of radially inner recessed region 7b is continuous with radially inner face 4d. Furthermore, circumferentially recessed region 7c is contiguous with circumferentially lateral face 4b of protruding region 4, and face 7h of circumferentially recessed region 7c is continuous with circumferentially lateral face 4b.

Widths W4a through W4d of recess 7 are constant. More specifically, width W4a of radially outer recessed region 7a, width W4b of radially inner recessed region 7b, width W4c of outer circumferentially recessed region 7d at circumferentially recessed region 7c, and width W4d of inner circumferentially recessed region 7e at circumferentially recessed region 7c are respectively the same.

On the other hand, depths W5a through W5d of recess 7 are different. More specifically, depths (specifically, average depths) W5a, W5c of recessed regions 7a, 7d contiguous with outer region 4e of protruding region 4 are greater than depths (specifically, average depths) W5b, W5d of recessed regions 7b, 7e contiguous with inner region 4f of protruding region 4.

For example, depth W5a of radially outer recessed region 7a might be greater than depth W5b of radially inner recessed region 7b, and depth W5c of outer circumferentially recessed region 7d at circumferentially recessed region 7c might be greater than depth W5d of inner circumferentially recessed region 7e at circumferentially recessed region 7c. In addition, depth W5a of radially outer recessed region 7a might be greater than depth W5c of outer circumferentially recessed region 7d at circumferentially recessed region 7c, and depth W5d of inner circumferentially recessed region 7e at circumferentially recessed region 7c might be greater than depth W5b of radially inner recessed region 7b.

That is, depths W5a through W5d of recess 7 increase as one proceeds toward the exterior in the tire radial direction D2. Accordingly, recess volume (volume of the portion which is recessed relative to profile surface S2) at recessed regions 7a, 7d contiguous with outer region 4e of protruding region 4 is greater than recess volume at recessed regions 7b, 7e contiguous with inner region 4f of protruding region 4.

Constitution of tire 1 associated with the present embodiment is as described above; action of tire 1 associated with the present embodiment is described below.

First, because recess 7 is contiguous with protruding region 4, faces 7f through 7h of recess 7 are continuous with faces 4b through 4d of protruding region 4. As a result, when protruding region 4 (more specifically, faces 4b through 4d) is deformed, faces 7f through 7h of recess 7 are also deformed in accompaniment thereto. As a result, when mud has entered the interior of recess 7, this will facilitate expulsion of mud to the exterior of recess 7. Accordingly, improvement in the mud shedding capability of recess 7 is permitted.

Now, because of the existence of protruding region 4, any nonuniformity with regard to weight balance will cause the vehicle to vibrate. And the more toward the exterior and farther in the tire radial direction D2 from the rotational axis of the tire the greater will be vibration of the vehicle due to the imbalance in weight. In this regard, recess volume at recess 7 contiguous with outer region 4e of protruding region 4 (more specifically, radially outer recessed region 7a and outer circumferentially recessed regions 7d) is greater than recess volume at recess 7 contiguous with inner region 4f of protruding region 4 (more specifically, radially inner recessed region 7b and inner circumferentially recessed regions 7e).

This makes it possible to effectively suppress nonuniformity with regard to weight balance at the exterior in the tire radial direction D2. Accordingly, this makes it possible, for example, to suppress vibration of the vehicle due to presence of protruding region 4. And because recess 7 is contiguous with protruding region 4, it is possible to effectively suppress imbalance in weight.

As described above, the pneumatic tire 1 of the embodiment include a sidewall region 12 extending in a tire radial direction D2, the sidewall region 12 comprises a protruding region 4 that protrudes in a tire width direction D1, and a recess 7 that is recessed in the tire width direction D1, the protruding region 4 extends in the tire radial direction D2, and the recess 7 is contiguous with the protruding region 4.

In accordance with such constitution, sidewall region 12 is provided not only with protruding regions 4 which protrude in the tire width direction D1 but also with recesses 7 which are recessed in the tire width direction D1. This makes it possible to suppress nonuniformity with regard to weight balance due to presence of protruding regions 4. And because recess 7 is contiguous with protruding region 4, it is possible to further suppress imbalance in weight.

Furthermore, because recess 7 is contiguous with protruding region 4, when protruding region 4 is deformed, recess 7 is also deformed in accompaniment thereto. As a result, when mud (including clumps of sand produced when mud dries and so forth) has entered the interior of recess 7, because expulsion thereof to the exterior of recess 7 is facilitated, this makes it possible to improve the mud shedding capability of recess 7. Thus, uniformity with regard to weight balance is improved while the mud shedding capability of recess 7 is also improved.

In the pneumatic tire 1 of the embodiment, recess volume of the outer half-recess (recessed regions 7a, 7d contiguous with outer region 4e of protruding region 4) is greater than recess volume of the inner half-recess (recessed regions 7b, 7e contiguous with inner region 4f of protruding region 4).

In accordance with such constitution, addressing the fact that the more toward the exterior and farther in the tire radial direction D2 from the rotational axis of the tire the greater will be vibration of the vehicle due to the imbalance in weight, recess volume of the outer half-recess (recessed regions 7a, 7d contiguous with outer region 4e of protruding region 4) is greater than recess volume of the inner half-recess (recessed regions 7b, 7e contiguous with inner region 4f of protruding region 4). This makes it possible to effectively suppress nonuniformity with regard to weight balance at the exterior in the tire radial direction D2.

In the pneumatic tire 1 of the embodiment, depths W5a, W5c of the outer half-recess (recessed regions 7a, 7d contiguous with outer region 4e of protruding region 4) are greater than depths W5b, W5d of the inner half-recess (recessed regions 7b, 7e contiguous with inner region 4f of protruding region 4).

In accordance with such constitution, because depths W5a, W5c of the outer half-recess (recessed regions 7a, 7d contiguous with outer region 4e of protruding region 4) are greater than depths W5b, W5d of the inner half-recess (recessed regions 7b, 7e contiguous with inner region 4f of protruding region 4), recess volume of the outer half-recess (recessed regions 7a, 7d contiguous with outer region 4e of protruding region 4) is greater than recess volume of the outer half-recess (recessed regions 7b, 7e contiguous with inner region 4f of protruding region 4). This makes it possible to effectively suppress nonuniformity with regard to weight balance at the exterior in the tire radial direction D2.

The pneumatic tire 1 is not limited to the configuration of the embodiment described above, and the effects are not limited to those described above. It goes without saying that the pneumatic tire 1 can be variously modified without departing from the scope of the subject matter of the present invention. For example, the constituents, methods, and the like of various modified examples described below may be arbitrarily selected and employed as the constituents, methods, and the like of the embodiments described above, as a matter of course.

(1) The constitution of pneumatic tire 1 associated with the foregoing embodiment is such that the fact that depths W5a, W5c of recessed regions 7a, 7d contiguous with outer region 4e are greater than depths W5b, W5d of recessed regions 7b, 7e contiguous with inner region 4f causes recess volume of recessed regions 7a, 7d contiguous with outer region 4e to be greater than recess volume of recessed regions 7b, 7e contiguous with inner region 4f. However, pneumatic tire 1 is not limited to such constitution.

Figure 5:
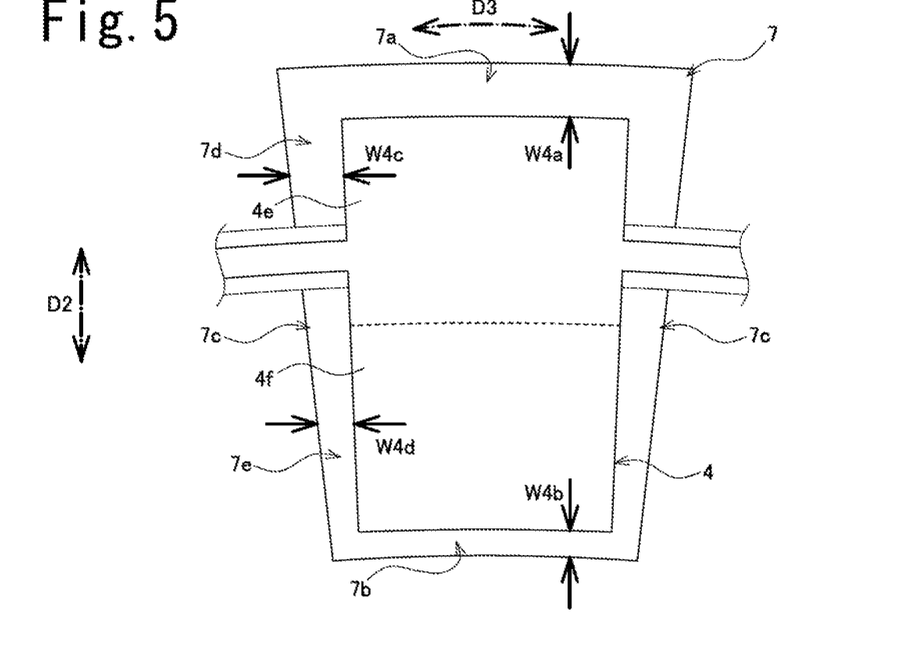
FIG. 5 is a side view (drawing as viewed in the tire width direction) of the principal components of a pneumatic tire associated with another embodiment.
Figure 6:
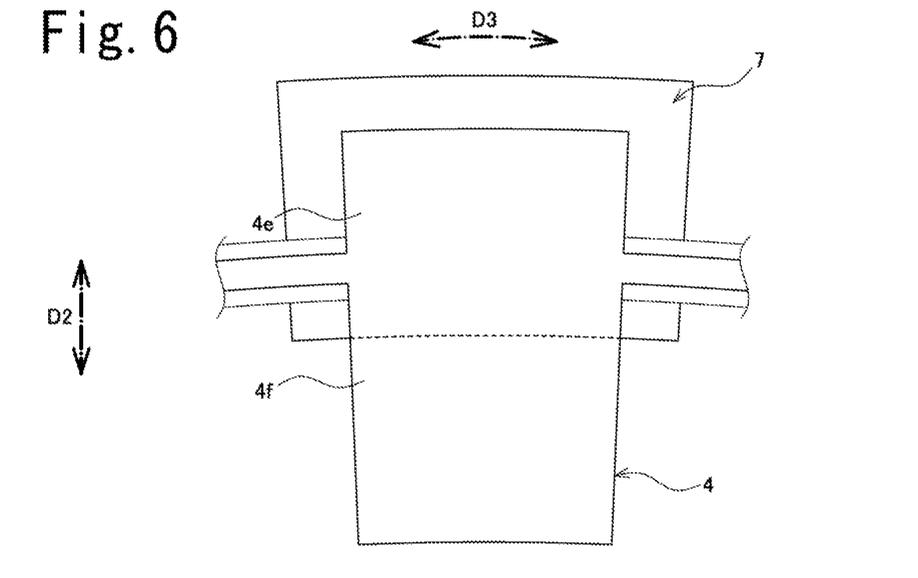
FIG. 6 is a side view (drawing as viewed in the tire width direction) of the principal components of a pneumatic tire associated with yet another embodiment.

To cause recess volume of recessed regions 7a, 7d contiguous with outer region 4e to be greater than recess volume of recessed regions 7b, 7e contiguous with inner region 4f, it is also possible to adopt a constitution in which, e.g., as shown in FIG. 5, widths W4a through W4d of recess 7 are made different, and/or to adopt a constitution in which, e.g., as shown in FIG. 6, recess 7 is arranged at only a portion of the periphery of protruding region 4.

(1-1) At the recess 7 which is associated with FIG. 5, depth of recess 7 is constant. In contrast, widths W4a through W4d of recess 7 are different. More specifically, widths (specifically, average widths) W4a, W4c of recessed regions 7a, 7d contiguous with outer region 4e of protruding region 4 are greater than widths (specifically, average widths) W4b, W4d of recessed regions 7b, 7e contiguous with inner region 4f of protruding region 4.

For example, width W4a of radially outer recessed region 7a might be greater than width W4b of radially inner recessed region 7b, and width W4c of outer circumferentially recessed region 7d at circumferentially recessed region 7c might be greater than width W4d of inner circumferentially recessed region 7e at circumferentially recessed region 7c. In addition, width W4a of radially outer recessed region 7a might be greater than width W4c of outer circumferentially recessed region 7d at circumferentially recessed region 7c, and width W4d of inner circumferentially recessed region 7e at circumferentially recessed region 7c might be greater than width W4b of radially inner recessed region 7b.

That is, widths W4a through W4d of recess 7 might increase as one proceeds toward the exterior in the tire radial direction D2.

Thus, constitution of the recess 7 associated with FIG. 5 is such that the widths W4a, W4c of the outer half-recess (recessed regions 7a, 7d contiguous with the region 4e which is toward the exterior in the tire radial direction D2 at protruding region 4) are greater than the widths W4b, W4d of the inner half-recess (recessed regions 7b, 7e contiguous with the region 4f which is toward the interior in the tire radial direction D2 at protruding region 4).

In accordance with such constitution, because widths W4a, W4c of the outer half-recess (recessed regions 7a, 7d contiguous with outer region 4e of protruding region 4) are greater than widths W4b, W4d of the inner half-recess (recessed regions 7b, 7e contiguous with inner region 4f of protruding region 4), recess volume of the outer half-recess (recessed regions 7a, 7d contiguous with outer region 4e of protruding region 4) is greater than recess volume of the inner half-recess (recessed regions 7b, 7e contiguous with inner region 4f of protruding region 4). This makes it possible to effectively suppress nonuniformity with regard to weight balance at the exterior in the tire radial direction D2.

(1-2) At the recess 7 which is associated with FIG. 6, width and depth of recess 7 are constant. However, recess 7 is arranged such that the area (length of edge) of outer region 4e in the tire radial direction D2 of protruding region 4 that is contiguous with the recess 7 is greater than the area (length of edge) of inner region 4f in the tire radial direction D2 of protruding region 4 that is contiguous with the recess 7. At FIG. 6, recess 7 is arranged so as to be contiguous only with outer region 4e of protruding region 4 (in the example shown in FIG. 6, there being no inner half-recess, the length of the boundary between the inner half-recess and inner region 4f is zero).

Thus, constitution of the recess 7 associated with FIG. 6 is arranged the area (length of edge) of outer region 4e in the tire radial direction D2 of protruding region 4 that is contiguous with the recess 7 is greater than the area (length of edge) of inner region 4f in the tire radial direction D2 of protruding region 4 that is contiguous with the recess 7.

In accordance with such constitution, because the area (length of edge) of recess 7 which is contiguous with the outer region 4e of protruding region 4 is greater than the area (length of edge) of recess 7 which is contiguous with the inner region 4f of protruding region 4, recess volume of the outer half-recess (portion of recess 7 which is contiguous with outer region 4e of protruding region 4) is greater than recess volume of the inner half-recess (portion of recess 7 which is contiguous with inner region 4f of protruding region 4). This makes it possible to effectively suppress nonuniformity with regard to weight balance at the exterior in the tire radial direction D2.

(2) Furthermore, the constitution of pneumatic tire 1 associated with the foregoing embodiment is such that recess volume at the outer half-recess (recessed regions 7a, 7d contiguous with outer region 4e of protruding region 4) is greater than recess volume at the inner half-recess (recessed regions 7b, 7e contiguous with inner region 4f of protruding region 4). However, pneumatic tire 1 is not limited to such constitution. It is also possible, for example, to adopt a constitution in which recess volume at the outer half-recess (recessed regions 7a, 7d contiguous with outer region 4e) is the same as recess volume at the inner half-recess (recessed regions 7b, 7e contiguous with inner region 4f), and it is also possible, for example, to adopt a constitution in which this is less than the recess volume at the inner half-recess (those recessed regions 7b, 7e).

(3) Furthermore, the constitution of pneumatic tire 1 associated with the foregoing embodiment is such that dimension W2a in the tire circumferential direction D3 at protruding region 4 is greater than dimension W3b, which corresponds to the flat portion of gap 6 in the tire circumferential direction D3 between protruding regions 4, 4. However, pneumatic tire 1 is not limited to such constitution. For example, it is also possible to adopt a constitution in which dimension W2a in the tire circumferential direction D3 at protruding region 4 is less than dimension W3b, which corresponds to the flat portion of gap 6 in the tire circumferential direction D3 between protruding regions 4, 4, and it is also possible, to adopt a constitution in which this is the same as that dimension W3b.

(4) Furthermore, the constitution of pneumatic tire 1 associated with the foregoing embodiment is such that dimension W2a in the tire circumferential direction D3 at protruding region 4 is greater than dimension W3a at gap 6 in the tire circumferential direction D3 between protruding regions 4, 4. However, pneumatic tire 1 is not limited to such constitution. For example, it is also possible to adopt a constitution in which dimension W2a in the tire circumferential direction D3 at protruding region 4 is less than dimension W3a at gap 6 in the tire circumferential direction D3 between protruding regions 4, 4, and it is also possible to adopt a constitution in which this is the same as that dimension W3a.

(5) Furthermore, the constitution of pneumatic tire 1 associated with the foregoing embodiment is such that dimension W2b in the tire radial direction D2 of protruding region 4 is greater than dimension W2a in the tire circumferential direction D3 of protruding region 4. However, pneumatic tire 1 is not limited to such constitution. For example, it is also possible to adopt a constitution in which dimension W2b in the tire radial direction D2 of protruding region A is less than dimension W2a in the tire circumferential direction D3 of protruding region 4, and it is also possible to adopt a constitution in which this is the same as that dimension W2a.

(6) Furthermore, it is preferred that constitution of pneumatic tire 1 be such that protruding volume (volume of the portion which protrudes relative to profile surface S2) at protruding region 4 is the same as recess volume (volume of the portion which is recessed relative to profile surface S2) at recess 7. Such a constitution will make it possible to effectively suppress imbalance in weight. Note that it is also possible to adopt a constitution in which protruding volume at protruding region 4 is greater than recess volume at recess 7, and it is also possible to adopt a constitution in which this is less than recess volume at recess 7.

(7) Furthermore, the constitution of pneumatic tire 1 associated with the foregoing embodiment is such that recess 7 is provided at all protruding regions 4. However, pneumatic tire 1 is not limited to such constitution. For example, it is sufficient that recess 7 be provided at at least one of the plurality of protruding regions 4. Moreover, a constitution in which recess 7 is provided at at least one-quarter of the plurality of protruding regions 4 is preferred, a constitution in which it is provided at at least one-third thereof is more preferred, and a constitution in which it is provided at at least one-half thereof is still more preferred.

(8) Furthermore, the constitution of pneumatic tire 1 associated with the foregoing embodiment is such that all of the protruding regions 4 are of the same shape, and all of the recesses 7 are of the same shape. However, pneumatic tire 1 is not limited to such constitution. For example, it is also possible to adopt a constitution in which protruding regions 4 are provided with a plurality of different shapes, these respectively being arranged in order in the tire circumferential direction D3. Furthermore, it is also possible, for example, to adopt a constitution in which recesses 7 are provided with a plurality of different shapes, these being arranged in order in the tire circumferential direction D3 at the respective protruding regions 4.

(9) Furthermore, in the context of a constitution in which protruding regions 4 are provided at both of the sidewall regions 12, the constitution of pneumatic tire 1 may be such that recess(es) 7 are provided only at protruding region(s) 4 at one of the sidewall regions 12, or the constitution may be such that these are provided at protruding region(s) 4 at both of the sidewall regions 12. For example, it is also possible to adopt a constitution in which recess(es) 7 are at least provided at protruding region(s) 4 at the sidewall region 12 which of the two sidewall regions 12 is the sidewall region 12 that is arranged so as to be toward the exterior when mounted on the vehicle.

What is claimed is:

1. A pneumatic tire comprising a sidewall region extending in a tire radial direction,
    wherein the sidewall region comprises a plurality of protruding regions which are arrayed in a tire circumferential direction, extend in the tire radial direction and protrude in a tire width direction, and a recess which is recessed in the tire width direction,
    wherein the plurality of protruding regions comprise a first protruding region which is contiguous with the recess, and a second protruding region which is adjacent to the first protruding region in the tire circumferential direction, the first protruding region and the second protruding region being arrayed with a gap between the first protruding region and the second protruding region;
    wherein the dimension of the first protruding region in the tire circumferential direction is greater than the dimension of the gap in the tire circumferential direction; and
    wherein the dimension of the first protruding region in the tire radial direction is greater than the dimension of the first protruding region in the tire circumferential direction.

2. The pneumatic tire according to claim 1 wherein the recess is made up of an outer half-recess contiguous with an outer region in the tire radial direction of the first protruding region, and an inner half-recess contiguous with an inner region in the tire radial direction of the first protruding region; and
    the recess volume of the outer half-recess is greater than the recess volume of the inner half-recess.

3. The pneumatic tire according to claim 2 wherein the depth of the outer half-recess is greater than the depth of the inner half-recess.

4. The pneumatic tire according to claim 2 wherein the recess comprises a radially outer recessed region that is contiguous with an exterior face in the tire radial direction of the first, protruding region, and a radially inner recessed region that is contiguous with an interior face in the tire radial direction of the first protruding region; and
    wherein the depth of the radially outer recessed region is greater than the depth of the radially inner recessed region.

5. The pneumatic tire according to claim 2 wherein the recess comprises a circumferentially recessed region that is contiguous with the first protruding region in a tire circumferential direction,
wherein the circumferentially recessed region comprises an outer circumferentially recessed region that is contiguous with the outer region in the tire radial direction of the first protruding region, and an inner circumferentially recessed region that is contiguous with the inner region in the tire radial direction of the first protruding region, and
wherein the depth of the outer circumferentially recessed region is greater than the depth of the inner circumferentially recessed region.

6. The pneumatic tire according to claim 2 wherein the recess comprises a radially outer recessed region that is contiguous with an exterior face in the tire radial direction of the first protruding region, a radially inner recessed region that is contiguous with an interior face in the tire radial direction of the first protruding region, and a circumferentially recessed region that is contiguous with the first protruding region in a tire circumferential direction,
wherein the circumferentially recessed region comprises an outer circumferentially recessed region that is contiguous with the outer region in the tire radial direction of the first protruding region, and an inner circumferentially recessed region that is contiguous with the inner region in the tire radial direction of the first protruding region,
wherein the depth of the radially outer recessed region is greater than the depth of the outer circumferentially recessed region,
wherein the depth of the outer circumferentially recessed region is greater than the depth of the inner circumferentially recessed region, and
wherein depth of the inner circumferentially recessed region is greater than depth of the radially inner recessed region.

7. The pneumatic tire according to claim 2 wherein the width of the outer half-recess as greater than the width of the inner half-recess.

8. The pneumatic tire according to claim 1.
wherein the sidewall region comprises an annular projection which extends in the tire circumferential direction,
wherein the first protruding region is provided with an outer region which is arranged outwardly in the tire radial direction and an inner region which is arranged inwardly in the tire radial direction, the outer region and the inner region being regions which are respectively formed by bisecting the first protruding region in the tire radial direction, and
wherein the annular projection is contiguous with the outer region.

9. The pneumatic tire according to claim 8,
wherein the recess is made up of an outer half-recess which is contiguous with the outer region, and an inner half-recess which is contiguous with the inner region:
wherein the recess volume of the outer half-recess is greater than the recess volume of the inner half-recess; and
wherein a length of a first boundary between the outer half-recess and the outer region is greater than a length of a second boundary between the inner half-recess and the inner region.

10. The pneumatic tire according to claim 9,
wherein the protruding dimension by which the annular projection protrudes from a profile surface is less than the protruding dimension by which the first protruding region protrudes from the profile surface where the profile surface is a reference surface constituting a part of an outer surface of the sidewall region in a side view of the sidewall region drawn in the tire width direction.

11. The pneumatic. tire according to claim 10,
wherein the first protruding region protrudes outwardly in the tire width direction from the profile surface.
wherein the recess is dented inwardly in the tire width direction from the profile surface in the side view of the sidewall region, and
wherein the protruding dimension by which the first protruding region protrudes from the profile surface is greater than the recess dimension by which the recess is dented from the profile surface in the side view of the sidewall region.

12. The pneumatic tire according to claim 11,
wherein the protruding volume by which the first protruding region protrudes from the profile surface is greater than the recess volume by which the recess is dented inwardly in the side view of the sidewall region.

13. The pneumatic tire according to claim 10,
wherein the gap between the first protruding region and the second protruding region has a flat portion at which the protruding regions and the recess are not present, and
wherein a surface of the flat portion is located more inwardly in the tire width direction than an apex of the first protruding region., and more outwardly in the tire width direction than a bottom surface of the recess, in the side view of the sidewall region.

14. A pneumatic tire comprising a sidewall region extending in a tire radial direction,
wherein the sidewall region comprises a protruding region which extends in the tire radial direction and protrudes in a tire width direction, a recess which is recessed in the tire width direction, and an annular projection which extends in a tire circumferential direction,
wherein the recess is contiguous with the protruding region,
wherein the protruding region is provided with an outer region which is arranged outwardly in the tire radial direction and an inner region which is arranged inwardly in the tire radial direction, the outer region and the inner region being regions which are respectively formed by bisecting the first protruding region in the tire radial direction, and
wherein the annular projection is contiguous with the outer region.

15. The pneumatic tire according to claim 14,
wherein the recess is made up of an outer half-recess which is contiguous with outer region, and an inner half-recess which is contiguous with the inner region
wherein the recess volume of the outer half-recess is greater than the recess volume of the inner half-recess; and
wherein a length of a first boundary between the outer half-recess and the outer region is greater than a length of a second boundary between the inner half-recess and the inner region.

16. The pneumatic tire according to claim 15,
wherein an amount by which the annular projection protrudes from a profile surface is less than an amount by which the first protruding region protrudes from the profile surface where the profile surface is a reference surface constituting a part of an outer surface of the sidewall region in a side view of the sidewall region drawn in the tire width direction.

17. A pneumatic tire comprising a sidewall region extending in a tire radial direction,
wherein the sidewall region comprises a first protruding region which extends in the tire radial direction and protrudes in a tire width direction, and a recess which is recessed in the tire width direction;
wherein the recess is contiguous with the first protruding region;
wherein the first protruding region protrudes outwardly in the tire width direction from a profile surface hi a side view of the sidewall region where the profile surface is a reference surface constituting a part of an outer surface of the sidewall region in a side view of the sidewall region drawn in the tire width direction;
wherein the recess is dented inwardly in the tire width direction from the profile surface in the side view of the sidewall region; and
wherein the protruding dimension by which the first protruding region protrudes outwardly from the profile surface is greater than the recess dimension by which the recess is dented inwardly from the profile surface in the side view of the sidewall region.

18. The pneumatic tire according to claim 17,
wherein the first protruding volume by which the first protruding region protrudes from the profile surface is greater than the recess volume by which the recess is dented inwardly in the side view of the sidewall region.

19. The pneumatic tire according to claim 18,
wherein the sidewall region comprises a plurality of protruding regions which are arrayed in a tire circumferential direction;
wherein the first protruding region is car e. of the plurality of protruding. regions;
wherein the plurality of protruding regions further comprise a second protruding region which is adjacent to the first protruding, region in the tire circumferential direction the first protruding region and the second protruding region being arrayed with a gap between the first protruding region and the second protruding, region:
wherein the gap between the first protruding region and the second protruding region has a flat portion at which, the protruding regions and the recess are not present, and
wherein a surface of, the fiat portion is located more inwardly in the tire width direction than an apex of the first protruding region, and, more outwardly in, the tire width direction than a bottom surface of the recess, in the side view of the sidewall region.

\* \* \* \* \*